United States Patent [19]

Peyran et al.

[11] Patent Number: 4,669,958
[45] Date of Patent: Jun. 2, 1987

[54] SWASHPLATE CONTROL SYSTEM

[75] Inventors: Richard J. Peyran, Palo Alto; Georgene H. Laub; H. Andrew Morse, both of Sunnyvale, all of Calif.

[73] Assignee: The United States of America as represented by the Administrator of the National Aeronautics and Space Administration, Washington, D.C.

[21] Appl. No.: 846,439

[22] Filed: Mar. 31, 1986

[51] Int. Cl.[4] .................... B64C 27/58; B64C 27/605
[52] U.S. Cl. .................................... 416/114; 416/158
[58] Field of Search .............. 416/114, 115, 158, 108, 416/109, 112, 113; 74/60

[56] References Cited

U.S. PATENT DOCUMENTS

| 2,439,089 | 4/1948 | Hodson | 416/114 |
| 2,587,104 | 2/1952 | Breguet | 416/115 |
| 2,861,640 | 11/1958 | DuPont | 416/114 |
| 2,978,038 | 4/1961 | Doman et al. | 416/114 |
| 3,256,780 | 6/1966 | Riley et al. | 416/114 |
| 4,235,116 | 11/1980 | Meijer et al. | 416/114 X |
| 4,445,421 | 5/1984 | Walker et al. | 416/114 X |
| 4,502,840 | 3/1985 | Roman | 416/114 |
| 4,519,743 | 5/1985 | Ham | 416/114 X |
| 4,534,704 | 8/1985 | McArdle | 416/158 |
| 4,538,961 | 9/1985 | Pariani | 416/114 |

FOREIGN PATENT DOCUMENTS

| 577968 | 6/1959 | Canada | 416/158 |
| 587372 | 11/1959 | Canada | 416/114 |
| 1041804 | 10/1958 | Fed. Rep. of Germany | 416/108 |
| 954219 | 12/1949 | France | 416/98 |

Primary Examiner—Everette A. Powell, Jr.
Attorney, Agent, or Firm—Darrell G. Brekke; John R. Manning; Robert D. Marchant

[57] ABSTRACT

A swashplate control system (10) has a first gimbal ring (26) pivotally mounted at (32) along a longitudinal axis. A second gimbal ring (24) is pivotally attached at (28) to the first gimbal ring (26) along a lateral axis. A longitudinal cyclic actuator (14) pivots the first gimbal ring (26) along the longitudinal axis. A lateral cyclic actuator (16) pivots the second gimbal ring (24) along the lateral axis. The lateral cyclic actuator (16) is mounted on the first gimbal ring (26). A swashplate (12) is rotatably mounted on the second gimbal ring (24).

7 Claims, 4 Drawing Figures

SWASHPLATE CONTROL SYSTEM

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

1. Field of the Invention

This invention pertains to a novel mechanical system for controlling position of a rotating swashplate. More particularly, it relates to such a novel mechanical system which preferably also provides independent lateral cyclic, longitudinal cyclic and collective pitch control of a helicopter rotor attached to the swashplate. Most especially, it relates to such a novel mechanical system which provides direct, linear readout of cyclic and collective swashplate positions.

2. Description of the Prior Art

There are many swashplate control systems in use today, both in production and research helicopters and for use in wind tunnels and similar environments for evaluating helicopter rotor blade designs. Generally, the functions and movements that must take place in such systems are the same regardless of the particular mechanical design of the system.

The following background information on the operation of a helicopter is useful for understanding the present invention. A helicopter rotor generates lift by accelerating a mass of air downwards through its blades. The resulting lift is proportional to the mass and velocity of the downwash. In flight, the blades bend in an upward direction, called coning, until gravity, lift and centrifugal force balance. The helicopter engine supplies torque to overcome drag, which also acts on the blades. In forward flight, blades advancing toward the nose of the helicopter encounter faster apparent airflow, the vector sum of forward and rotational velocity, than blades moving toward the tail of the helicopter. As a result, advancing blades generate greater lift than retreating blades, creating an inbalance unless compensation is made.

To assure stablility, most helicopters use two forms of compensation, i.e., flapping and feathering. Flapping makes the blades respond to increased lift on the advancing side by rising to a maximum angle over the nose and falling to a minimum angle over the tail. The flapping changes the apparent angle that the blades attack the air, compensating for the airflow variations. Feathering causes the pitch of the rotor blades to be varied sinusoidally as the rotor spins to compensate for the sinusoidal airflow variations. The pilot uses both feathering and flapping to stabilize the helicopter.

To allow flapping and feathering, the rotor blades are usually hinged or flexible at their hub. Fully articulated rotors have hinges for lead/lag motions induced by drag variations in addition to flapping or feathering. Pitch variations are transmitted from the cockpit to the blades by means of the swashplate.

Besides stabilizing the helicopter, the cyclic pitch variations are also used to control it. The collective pitch, i.e., the average value of the cyclic pitch, determines the average lift of the rotor blade. The collective pitch is thus varied to make the helicopter climb, descend and hover.

Changing the amplitude and phase of the pitch cycle unbalances the rotor, causing it to tilt in a particular direction. The helicopter then accelerates in that direction until it regains a stable position at the new velocity. The pilot transmits control motions via two sticks. A collective stick pushes the swashplate up and down on the rotor mast, changing the collective pitch. A cyclic stick tilts the swashplate, changing the amplitude and phase of the cyclic pitch.

A single engine helicopter has a much better chance to make a safe landing following a power failure than a single engine airplane. The landing maneuver for the helicopter is not automatic (after power failure) and it requires some clever management of energy on the pilot's part to prevent damage to man or machine. Failure to make a good entry into autorotation after the engine stops is one of the primary causes of helicopter accidents. The key to making a good entry is to maintain rotor speed. The accepted way to stop rotor speed decay is to quickly reduce the power demands on the rotor by lowering the collective stick.

Existing swashplate control systems used in production helicopters usually incorporate a mixer box for cyclic and collective inputs prior to the swashplate. The mixer box is required to uncouple the collective, lateral cyclic and longitudinal cyclic inputs to the swashplate. This adds considerable complexity to the system.

Existing swashplate control systems used in wind tunnel test programs have uncoupled the cyclic and collective inputs by attaching the cyclic actuators to the collective slider assembly and allowing the actuators to float with the collective actuator inputs. Two cyclic actuators mounted 90 degrees apart about the swashplate rotation axis provide longitudinal and lateral cyclic inputs. However, because the cyclic actuators are both fixed to the same reference frame, when one of the cyclic inputs is large and the other cyclic input is increased, the first cyclic position changes by a small amount. Therefore, the two cyclic inputs are not truly uncoupled. With existing systems, direct, linear readout of the cyclic swashplate positions has not been possible.

Specific examples of prior art swashplate operating mechanisms are disclosed in the following issued U.S. patents. U.S. Pat. No. 2,978,038, issued Apr. 4, 1968 to Doman et al., discloses a swashplate operating mechanism with hydraulic servos for changing the angle of the swashplate longitudinally or laterally and for raising and lowering the swashplate. U.S. Pat. No. 4,235,116, issued Nov. 25, 1980 to Meijer et al., discloses a wobble plate drive mechanism with restraint provided by balanced gimbal rings. U.S. Pat. No. 4,445,421, issued May 1, 1984 to Walker et al. discloses a redundant swashplate control system which includes at least five actuators coupled to the swashplate. Despite the well developed status of the prior art, a need remains for further improvements in swashplate control systems to meet the needs of present and future helicopter development.

SUMMARY OF THE INVENTION

Accordingly, it is an object of this invention to provide a swashplate control system that provides a better control over rotor blade positioning under different operating conditions than obtainable with prior art swashplate control systems.

It is another object of the invention to provide such a swashplate control system that decouples lateral and longitudinal cyclic inputs to the swashplate without requiring the use of a mixer box.

It is a further object of the invention to provide such a swashplate control system which provides direct, linear read-out of lateral cyclic, longitudinal cyclic and collective swashplate positions.

It is still another object of the invention to provide such a swashplate control system that returns the swashplate to a zero collective position rapidly when desired.

The attainment of these and related objects may be achieved through use of the novel swashplate control system herein disclosed. A swashplate control system in accordance with this invention has a first gimbal ring pivotally mounted along a longitudinal axis. A second gimbal ring is pivotally attached to the first gimbal ring along a lateral axis. A first linear actuator is connected to pivot the first gimbal ring along the longitudinal axis. A second linear actuator is connected to pivot the second gimbal ring along the lateral axis. One of the first and second linear actuators is mounted on one of the first and second gimbal rings. A swashplate is rotatably mounted on one of the first and second gimbal rings. A swashplate control system constructed in accordance with this invention makes the longitudinal and lateral cyclic inputs to the swashplate truly independent of one another, so that these inputs are decoupled from each other without use of a mixer box.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
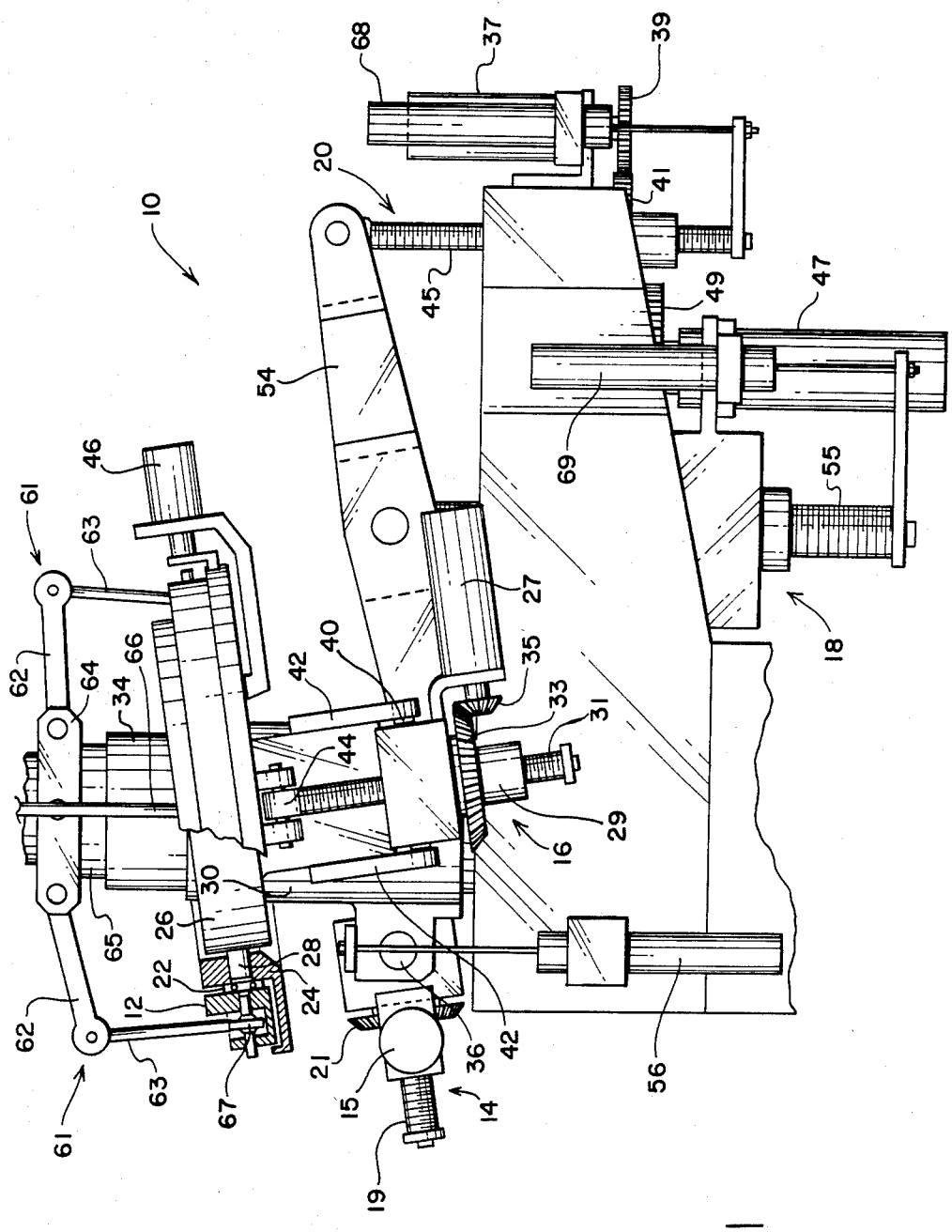
FIG. 1 is a side view of a swashplate control system in accordance with the invention.
Figure 2:
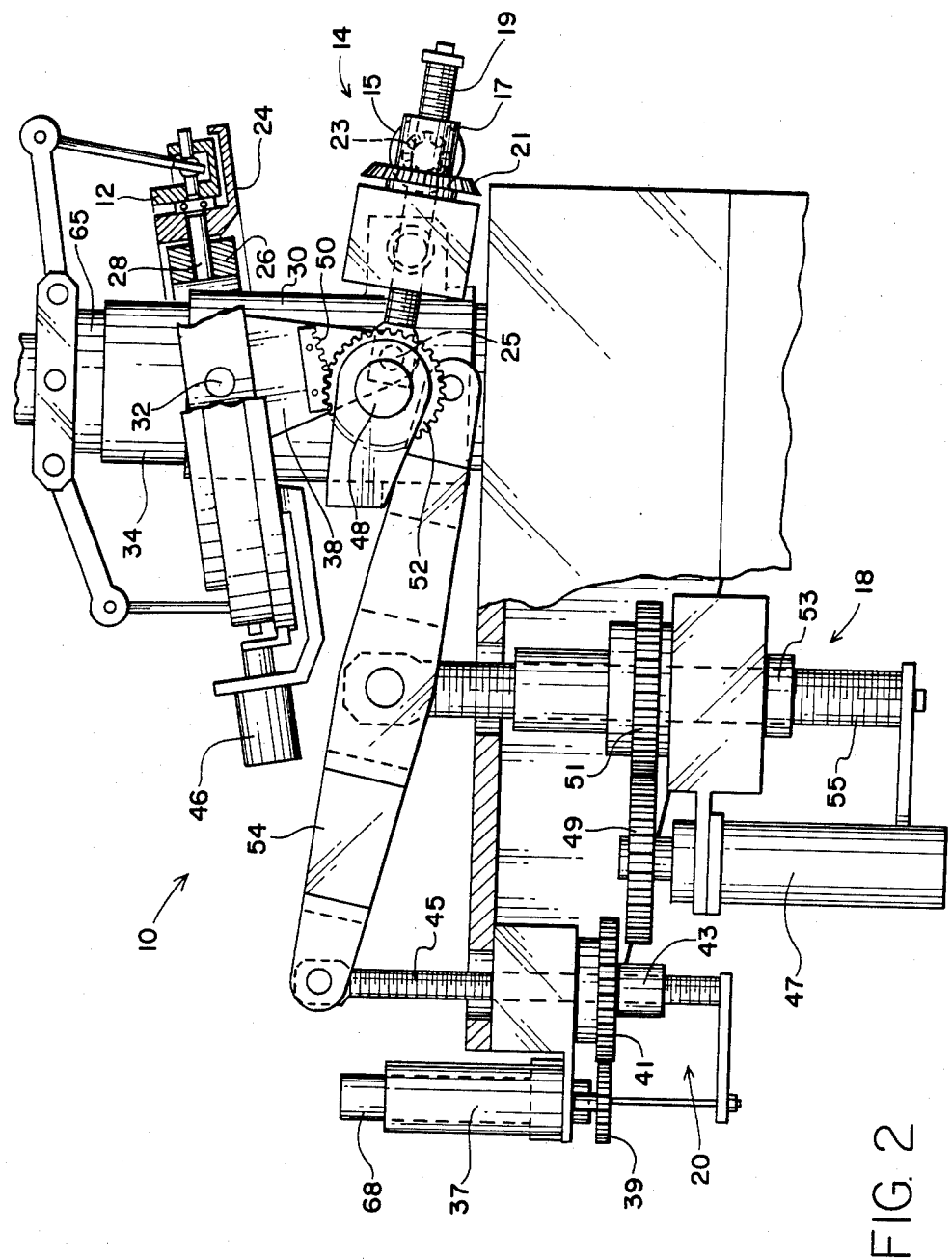
FIG. 2 is another side view of a portion of the swashplate control system shown in FIG. 1.
Figure 3:
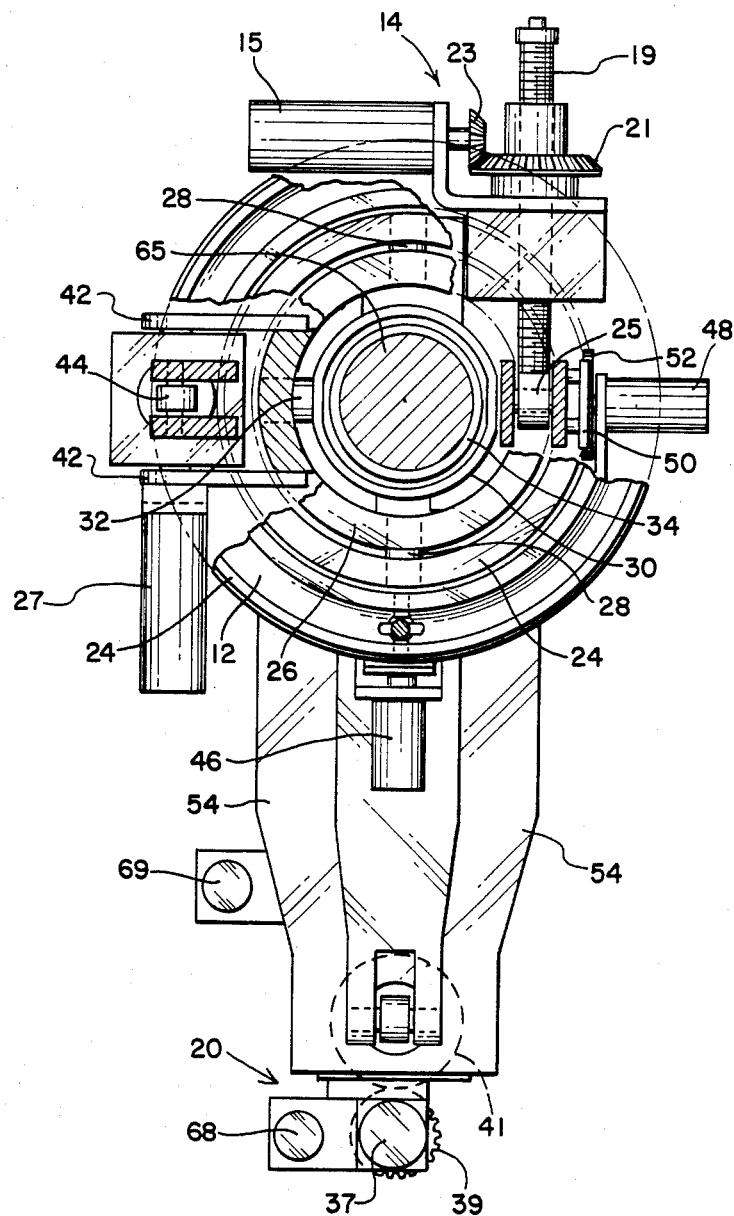
FIG. 3 is a top view of the swashplate control system of FIGS. 1 and 2.
Figure 4:
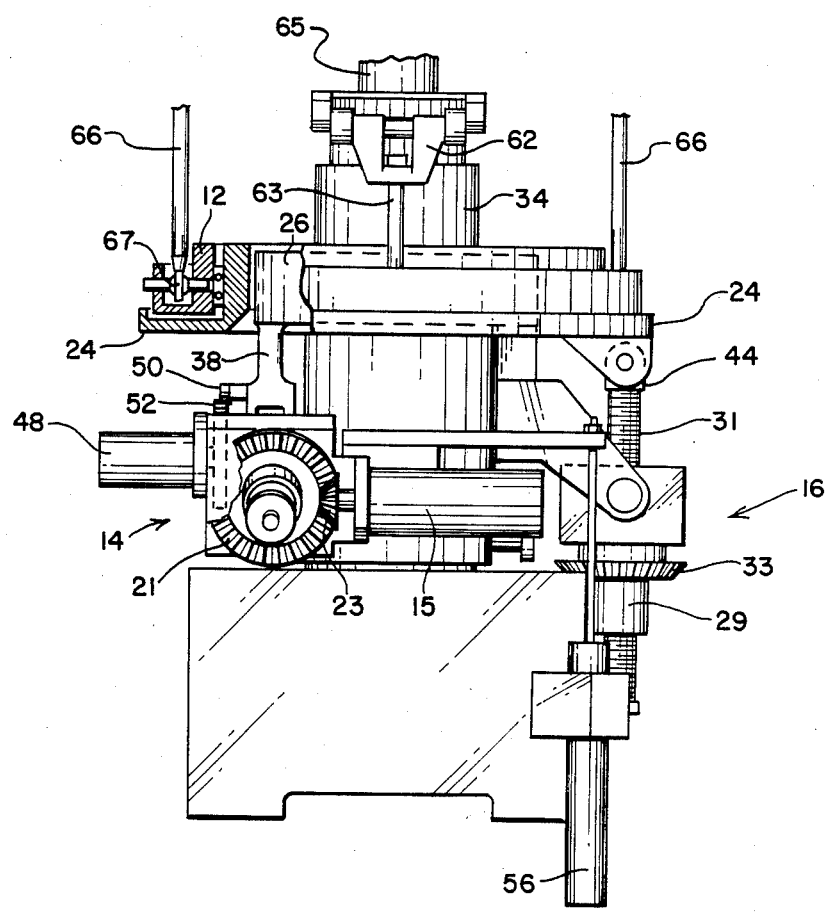
FIG. 4 is an end view of the swashplate control system shown in FIGS. 1-3.

Turning now to the drawings, more particularly to FIGS. 1-4, there is shown a swashplate control system 10 in accordance with the invention. The system 10 has a rotating swashplate 12, the position of which is controlled by four linear actuators 14, 16, 18 and 20. Scissor assemblies 61 comprise articulated arms 62, 63 and a collar 64 which is fastened to rotor shaft 65. When the shaft 65 and the rotor blades mounted thereon (not shown) are rotated, scissor assemblies 61 cause the rotating swashplate 12 to rotate in synchronism with the shaft. Bearings 22 enable the rotating swashplate 12 to freely rotate concentrically about non-rotating swashplate 24, which also serves as an outer gimbal ring. The pitch of each rotor blade is directly controlled by a pitch control rod 66. Each pitch control rod 66 has a lower end 67 which is pivotally supported in rotating swashplate 12 (FIG. 4). The upper end of each control rod 66 is coupled to the rotor blade hub (not shown) which forms no part of this invention. The pitch of a particular rotor blade is a function of the vertical displacement of the pitch control rod 66 associated therewith. Although only two pitch control rods 66 are depicted it is to be understood that additional rods may be employed when more than two rotor blades are utilized. The non-rotating swashplate and outer gimbal 24 is pinned to an inner gimbal 26 by pivot pins 28 and can only pivot from side to side relative to the inner gimbal 26. The inner gimbal 26 is pinned to a collective slider 30 by pins 32 (see also FIG. 3) and can only pivot fore and aft. The rotating swashplate 12, non-rotating swashplate 24, inner gimbal 26 and collective slider 30 can slide up and down on a collective standpipe 34. The longitudinal cyclic actuator 14 is trunnion mounted at 36 to the collective slider 30 and rotates the inner gimbal 26 by means of a control horn 38 attached to the inner gimbal. The longitudinal cyclic actuator 14 includes a drive motor 15 connected to drive ball nut 17 on threaded shaft 19 by means of bevel gears 21 and 23. Threaded shaft 19 is pivotally connected to the control horn 38 at 25. The lateral cyclic actuator 16 is trunnion mounted at 40 to the inner gimbal ring 26 by means of mounting brackets 42. The lateral cyclic actuator 16 includes a drive motor 27 connected to drive ball nut 29 on threaded shaft 31 by means of bevel gears 33 and 35. End 44 of the lateral actuator 16 is pivotally connected to the non-rotating swashplate 24.

Read-out of cyclic pitch position is accomplished with a lateral cyclic rotary transducer 46 and a longitudinal rotary cyclic transducer 48. The lateral cyclic transducer 46 is aligned with the lateral cyclic pivot axis formed by the pins 28, best shown in FIG. 3. This transducer measures the angle between the inner gimbal 26 and the non-rotating swashplate 24. The longitudinal cyclic transducer 48 measures the angle between the inner gimbal 26 and the collective slider 30. To minimize the width of the system 10, the longitudinal cyclic transducer 48 is located below the longitudinal pivot axis formed by the pins 32 (see FIGS. 2 and 3). Gear segment 50 is fixedly attached to the control horn 38 and engages the gear 52 to rotate the transducer 48 as the inner gimbal 26 rotates. The gear segment 50 and gear 52 drive the transducer 48 to provide a linear read-out of longitudinal cyclic pitch with a 2:1 amplification.

Collective pitch is applied to rotor blades connected to the system 10 by means of a control yoke 54, which pivots about a fast collective actuator 18, which is normally fixed in position. The control yoke 54 is usually driven by a second collective actuator 20 to adjust the rotor blades to a desired collective pitch. The second collective actuator 20 includes a drive motor 37 connected by means of gears 39 and 41 to drive ball nut 43 on threaded shaft 45. The control yoke raises the collective slider 30, to which the swashplates 12 and 24, cyclic actuators 14 and 16 and transducers 46 and 48 are attached. To provide a quick return to a zero collective pitch, the fast collective actuator 18 can be driven, which amplifies the collective slider 30 motion by 2:1. The fast collective actuator 18 consists of a drive motor 47 connected by means of gears 49 and 51 to drive ball nut 53 on threaded shaft 55. A read-out of collective pitch position is given by a linear collective pitch transducer 56. Transducers 68 and 69 are employed to monitor the motion of lead screws 45 and 55, respectively. The transducers may be used as a redundant means to monitor collective pitch and/or they may be employed to prevent the stoppage of the lead screws before an excursion limit is reached. The drive motors 15, 27, 37 and 47 are desirably implemented as servomotors. The transducers 46, 48, 56, 68 and 69 are desirably implemented as potentiometers.

It should now be readily apparent to those skilled in the art that a novel swashplate control system capable of achieving the stated objects of the invention has been provided. The use of gimbals driven by separate lateral and longitudinal actuators decouples lateral and longitudinal drive without requiring the use of a mixer box. Direct, linear read-out of lateral cyclic, longitudinal cyclic and collective swashplate positions is provided. An independent fast actuator returns the swashplate to zero collective position rapidly, if desired. These features make the system especially useful for swashplate control of production helicopters and wind tunnel test models of helicopters or rotor blade assemblies.

It should further be apparent to those skilled in the art that various changes in form and detail of the invention as shown and described may be made. It is intended that such changes be included within the spirit and scope of the claims appended hereto.

What is claimed is:

1. A swashplate control system, which comprises a first gimbal ring pivotally mounted along a longitudinal axis, a second gimbal ring pivotally attached to said first gimbal ring along a lateral axis, a first linear actuator connected to pivot said first gimbal ring along the longitudinal axis, a second linear actuator connected to pivot said second gimbal ring along the lateral axis, one of said first and second linear actuators being mounted on one of said first and second gimbal rings, and a swashplate rotatably mounted on one of said first and second gimbal rings.

2. The swashplate control system of claim 1 in which said swashplate is rotatably mounted on said second gimbal ring.

3. The swashplate control system of claim 2 in which said second linear actuator is mounted on said first gimbal ring.

4. The swashplate control system of claim 1 in which said swashplate, said first and second gimbal rings and said first and second linear actuators are carried by a collective slider, said collective slider being slidably mounted on a vertical support, said swashplate control system further comprising a first collective actuator coupled to move said collective slider along said vertical support.

5. The swashplate control system of claim 4 in which said first collective actuator is coupled to move said collective slider by means of a yoke pivotally connected at a first end to said collective slider and at a second end to said first collective actuator, said swashplate control system additionally comprising a second, fast collective actuator pivotally connected to said yoke between the first and second ends to provide an amplification of collective slider motion as provided by said first collective actuator.

6. The swashplate control system of claim 5 additionally comprising a collective pitch transducer connected to sense movement of said collective slider on said vertical support.

7. The swashplate control system of claim 1 additionally comprising a longitudinal rotary transducer connected to sense pivoting motion of said first gimbal ring and a lateral rotary transducer connected to sense pivoting motion of said second gimbal ring relative to said first gimbal ring.

* * * * *